Dec. 6, 1949     L. OHL     2,490,648
CENTER LOCATING TOOL
Filed Jan. 17, 1946
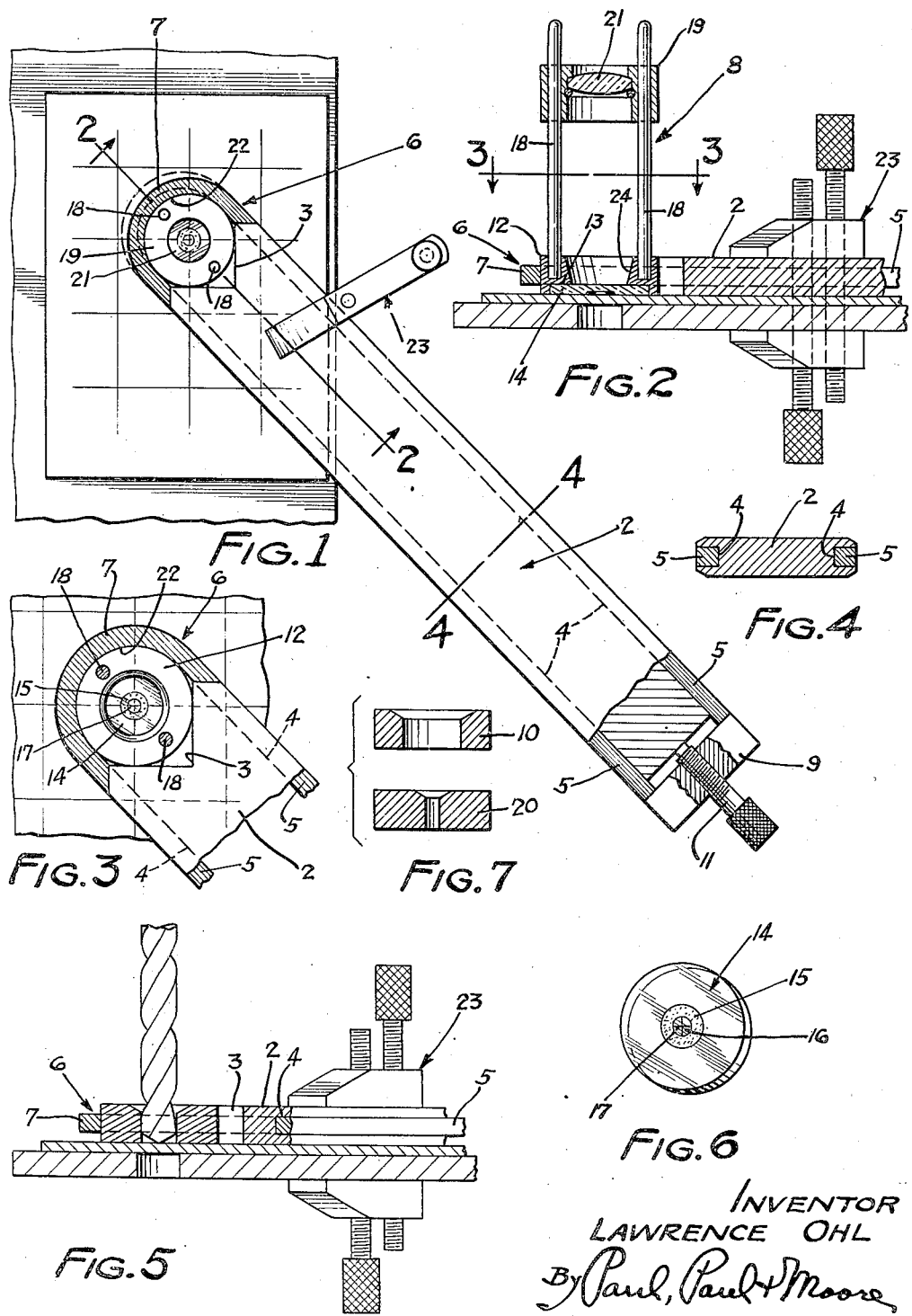
INVENTOR
LAWRENCE OHL
By Paul, Paul & Moore
ATTORNEYS Patented Dec. 6, 1949

2,490,648

UNITED STATES PATENT OFFICE 2,490,648

CENTER LOCATING TOOL

Lawrence Ohl, St. Louis Park, Minn.

Application January 17, 1946, Serial No. 641,823

1 Claim. (Cl. 33—46)

This invention relates to new and useful improvements in centering means or tools adapted for use to facilitate the operation of accurately locating the center of a hole to be drilled, bored or reamed in dies, tools, drill jigs, and numerous other articles where extreme accuracy in the locations of the centers or holes is of utmost importance.

In the operation of drilling holes in dies, tools, drill jigs, and various other articles, it is usually customary to first locate the centers of the holes to be drilled upon the work by scribing hair lines thereon which must be accurately located on the work by suitable instruments, the hair lines intersecting at the particular point where a hole is to be drilled in the work. After the hair lines have been accurately laid out upon the work, the point of intersection of the two hair lines is centerpunched to indent the surface of the work sufficiently to receive a drill point.

It is usually extremely difficult to accurately drill small holes because of the tendency of the drill point to "run off" or shift, which may be caused by variations in the porosity of the metal to be drilled or due to blow holes.

Numerous attempts have heretofore been made to provide means for accurately guiding a drill into or through the work, but such devices have been expensive and usually require considerable time to properly position them on the work.

It is therefore highly desirable that some means be provided whereby the operation of accurately drilling a piece of work may be expedited and facilitated, and it is a purpose of this invention to provide a simple and inexpensive tool which meets all of the requirements of such a tool, and which may be quickly accurately positioned upon the work by an unskilled mechanic in a comparatively short period of time, whereby a marked saving of time and labor is effected and with the assurance of greater accuracy, whereby the operation of accurately drilling a piece of work such as a die, drill jig, and various other kinds of work may be expeditiously and accurately performed at a marked reduction in cost.

A further object of the invention is to provide a tool for accurately locating drill centers, comprising an elongated body having means at one end for removably securing thereto a suitable magnifier with its axis disposed at right angles to the median plane of the body of the tool, and said magnifier having a transparent plate at its bottom provided with a reticle or crosshairs adapted to substantially directly contact the surface of the work, whereby the danger of error due to optical parallax may be completely eliminated, and also whereby the operation of accurately positioning the tool upon the work with reference to the intersecting guide lines previously having been provided upon the surface thereof is greatly facilitated, and means being provided for quickly securing the tool to the work when the tool has been accurately positioned thereon by means of the magnifier. The magnifier may then be removed from the tool and a suitable drill bushing substituted therefor.

A further object is to provide a tool of the class described comprising an elongated flat body provided at one end with a V-shaped notch and having longitudinally extending grooves in its side edges, and a clamping member having spaced legs receivable in said grooves and provided at one end with means adapted to cooperate with said V-shaped notch to interchangeably secure a suitable magnifier or drill bushing in the end of the tool body, said magnifier being provided at its bottom with a transparent element or glass plate having its bottom surface provided with an axially disposed opaque annular portion defining a small axially disposed circular transparent center having a reticle imposed on the bottom surface thereof, and the magnifier having a magnifying lens mounted for relative adjustment with respect to the glass at the bottom of the magnifier, whereby said magnifying lens may be focused to greatly enlarge the reticle, so that the operator or mechanic may readily align the reticle with the cross-hairs or lines provided on the work without danger of error, after which the tool is secured in position upon the work and a suitable drill bushing substituted for the magnifier.

Other objects of the invention reside in the simple and inexpensive construction of the tool, whereby it may be quickly accurately positioned upon the work in preparation for a drilling operation; in the construction of such a tool which is extremely light in weight and convenient to manipulate, and which is so constructed that the magnifier may be quickly secured thereto to facilitate locating the tool upon the work, after which the magnifier may as readily be removed from the tool and a predetermined drill bushing substituted therefor; in the provision of such a tool which readily lends itself for use in the accurate locating of drill centers or holes in all classes of work where extreme accuracy is of utmost importance; and in the provision of such a tool which comprises few parts, all of which are so constructed that they may be machined and produced in quantity production at low cost, and the operation of which is such that an unskilled mechanic may with a little care readily and accurately drill holes in a piece of work with the assurance that each hole will be accurately located therein.

Other objects of the invention will appear from the following description and the accompanying drawings and will be pointed out in the annexed claim.

In the accompanying drawings there has been disclosed a structure designed to carry out the various objects of the invention, but it is to be understood that the invention is not confined to the exact features shown, as various changes may be made within the scope of the claim which follows.

In the drawings:

Figure 1 is a plan view of the tool showing it positioned upon a piece of work;

Figure 2 is a sectional detail view on the line 2—2 of Figure 1, showing the reticle of the magnifier positioned in direct contact with the surface of the work to be operated upon;

Figure 3 is a sectional plan view on the line 3—3 of Figure 2, showing the reticle of the magnifier accurately registered with the crosshairs or lines scribed on the surface of the work;

Figure 4 is a detail sectional view on the line 4—4 of Figure 1;

Figure 5 is a detail sectional view similar to Figure 2, but showing the magnifier removed and a drill bushing substituted therefor;

Figure 6 is a bottom view of the glass plate provided at the bottom of the magnifier to more clearly show the reticle or crosshairs provided thereon; and Figure 7 is a detail sectional view showing drill bushings of different sizes.

The novel tool herein disclosed is shown comprising an elongated body 2 which preferably is flat and uniformly rectangular throughout in cross section, as shown in Figure 4, and is provided at one end with a V-shaped notch 3. The flat rectangular body 2 thus affords upper and lower broad, elongated and uninterrupted flat surfaces either of which surface is adapted to engage the surface of a workpiece throughout the juxtaposed areas of contact and permit the tool to rest stably upon the workpiece surface with the median plane of the tool parallel thereto. Longitudinally extending grooves 4 are provided in the opposed side edges of the body 2 adapted to receive the spaced legs 5 of a suitable clamping member, generally designated by the numeral 6. The legs 5 are secured together at one end of the clamping member by a semi-circular portion 7 which may be an integral part of the legs 5—5, as will readily be understood by reference to Figure 1. The curved or arcuately formed portion 7 cooperates with the V-shaped notch 3 to clampingly secure a suitable magnifier, generally designated by the numeral 8, in position in the end of the tool, as shown in Figures 1, 2 and 3.

The opposite ends of the legs 5 of the clamping member 6 are shown secured to a cross head 9 having a clamping screw 11 received in threaded engagement therewith, the inner terminal of which is adapted to engage the end of the tool body, whereby when the clamping screw is rotated in one direction, the curved ar arcuately formed portion 7 at the opposite end thereof will clampingly secure the magnifier in the position shown in Figures 1 and 2. To release the magnifier the clamping screw 11 is rotated in the opposite direction, as will be readily understood.

The magnifier, as best shown in Figure 2, comprises a base portion 12 having a recess 13 in its bottom face adapted to receive a transparent glass panel 14, having an annular opaque central portion 15 which has a transparent center 16, as best illustrated in Figure 6. A suitable reticle or crosshairs 17 are scribed in the bottom face of the glass 14 across its transparent center 16.

Upright posts 18 are mounted in the base 12 of the magnifier to provide guides for a movable frame or head 19, carrying a magnifying lens or glass 21, as shown in Figure 2. The frame 19 is vertically slidable upon the rods or posts 18, thereby to facilitate accurately focusing the magnifying glass 21 with reference to the reticle 17 provided on the bottom surface of the magnifier glass panel 14.

The inner surface 22 of the semi-circular end portion 7 of the clamping member 6 is shaped to coincide substantially with the periphery of the base 12, whereby when the magnifier is secured in the end of the tool by manipulation of the clamping screw 11, the axis of the magnifying glass 21 and reticle 17 are disposed in right angular relation to the medium plane of the body 2 of the tool.

A plurality of suitable drill bushings 10 and 20 having drill guide holes therein varying from the minimum to the maximum sized holes to be drilled may be provided, as shown for example in Figure 7. The outside diameters of the drill bushings 10 and 20 coincide with the outside diameter of the base 12 of the magnifier, whereby they are interchangeable with the magnifier, as will be understood. Any desired number of bushings may be employed, it being understood that the outside diameters of all of said bushings are the same.

In the operation of the novel tool herein disclosed, the magnifier is removably secured in the end of the tool as shown for example in Figures 1 and 2, by manipulation of the screw 11, with the bottom surface of the base aligned with the bottom surface of the tool body. This may readily be accurately accomplished by simply placing the tool flatly upon a base plate or upon the work and then inserting the magnifier between the V-shaped notch and the curved portion 7 of the clamping member, whereby when the clamping member is manipulated to secure the magnifier in the tool, it will be accurately positioned therein.

The operator or mechanic then places the end of the tool in which the magnifier is secured directly upon the surface of the work to be drilled using the other end of the tool as a handle, and moves the magnifier about until the reticle or crosshairs thereof are accurately aligned or brought into registration with the crosshairs previously having been inscribed in the surface of the work, as clearly illustrated in Figure 1. When the crosshairs or reticle of the magnifier have been brought into accurate registration with the particular crosshairs of the work where the hole is to be drilled, the tool body is temporarily secured in fixed position upon the work by suitable means such as a conventional clamp, indicated by the numeral 23 in Figures 1, 2 and 5. The magnifier reticle, as hereinbefore stated, is provided upon the bottom surface of the transparent plate 14, whereby it may readily be moved into registration with the particular cross lines on the work when the hole is to be drilled.

As soon as the tool body has been firmly and accurately secured to the work, as shown in Figure 1, the clamping member 6 is manipulated to release the magnifier, and the latter is then removed and a suitable drill guide substituted therefor, as shown for example in Figure 5. The drill bushings are accurately machined so that when secured in the tool body, as shown in Figure 5, the guide hole provided therein will be axially aligned with the crosshairs on the work so that once the bushing has been properly positioned upon the work the operator or mechanic may operate the drill with the assurance that the hole to be drilled in the work will be accurately located therein.

The magnifying glass 21 of the magnifier has sufficient power to magnify or step up the size of the crosshairs or reticle on the bottom glass plate 14 thereof, so that the reticle may readily be aligned or moved into registration with the particular cross lines on the work where the hole is to be drilled, without eye strain. The magnifying glass 21, it will be noted by reference to Figure 2, is supported entirely by the two guide rods 18, and the enlarged hole or opening 24 provided in the base 12 admits sufficient light to the glass 14 to provide clear vision under all normal operating conditions.

This novel tool readily lends itself for use by tool and die makers and others requiring the use of such a tool. It may be furnished as a conveniently sized hand tool which may be carried in a pocket ready for immediate use. It may also be made in larger sizes and may be constructed as a separate accessory to a drill press, or as an attachment to a drill press. It may also in some instances be embodied in the construction of a drill press or other such piece of equipment.

By its use, shifting of holes cannot occur, due to variations in the porosity of the metal, or to blow holes in the work or castings, because the hardened steel guide bushings are firmly supported in position upon the work and serve to accurately guide the drill into or through the work at the proper location in the work.

In the construction of drill jigs, piercing dies and other tools, the use of this novel tool will eliminate the necessity of boring large holes and bushing them with hardened steel bushings, as is now common practice. This applies more particularly where the holes to be drilled are too small to be bored in a lathe or jig borer, and where the spacing between holes or other parts of the work must be held to close limits. In the case of piercing dies or jigs that require a large number of very small holes to be drilled therein, this tool will produce a much better job in less time.

The tool has a very wide range of utility in the manufacturing industry, as it may be effectively used in the construction of various forms of mechanical devices and other articles. Centering devices now in common use are expensive and slow to operate, and usually require skilled mechanics to manipulate them when accuracy is important, as in the construction of dies, jigs, and various other forms of tools to be used for production work. This tool requires but very little skill, as the operation of locating it is extremely simple and with the assurance that errors will be less frequent because with this method errors, if noted in time, can be corrected even though the drilling has been started.

The tool may be used for many other purposes than the accurate drilling of holes. It may be used for elongating round holes for blanking dies, and it may also be used for drilling multiple diameters or so-called counterbore holes in any combination of sizes within the capacity of the tool, with a saving of time and expense, in that it does not require a large number of counterborers and such tools to be carried in stock.

When it is desired to provide only a center punch mark on the surface of a piece of work to be used in scribing large circles in blanking dies and punches, a center punch having a diameter equal to the hole diameter of one of the bushings may be inserted through a suitable guide bushing and struck with a hammer in the usual manner, whereby the prick punch mark will be accurately located upon the work.

In actual use, the tool has been found to have great utility in machine shops and other places where such a tool may be used and where extreme accuracy is of utmost importance. Because of the reticle or cross-hairs of the magnifier being arranged to contact the surface of the work, and immediately above the locating lines previously made in the surface of the work, the operation of quickly and accurately locating the tool upon the work may be greatly expedited, with a corresponding saving in cost.

As hereinbefore stated, one of the dominant features of the invention resides in the simplicity of the tool and its operation, whereby an unskilled mechanic may quickly and accurately position the tool in registry with the locating lines provided on the work, and with the assurance that if the proper drill bushing is inserted in the tool in lieu of the magnifier, the work will be accurately drilled, when the drilling operation is completed.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

A center locating tool comprising a flat materially elongated body uniformally rectangular throughout in cross section and having upper and lower broad, elongated and uninterrupted flat surfaces adapted to engage a workpiece surface, the forward end thereof being adapted to be firmly clamped in position upon a workpiece with the median plane of said tool parallel to the surface thereof and the rearward end thereof serving as a handle portion, the forward end thereof having a gripping surface, each lateral edge of said body having a guideway formed therein, a clamping member movably positioned in said guideways, said member having an arcuate portion positioned opposite to said gripping surface and integral therewith a pair of guide bars engaged within said guideways, a cross-bar interconnecting the free ends of said guide bars, and means on said cross-bar for causing said body to move towards said arcuate portion, whereby said tool is adapted to rest stably upon a workpiece surface and be moved freely in horizontal directions over said workpiece surface maintaining the median plane of said tool parallel to the surface of said workpiece.

LAWRENCE OHL.

(References on following page)

REFERENCES CITED

The following references are of record in the file of this patent:

UNITED STATES PATENTS

| Number | Name | Date |
|---|---|---|
| 953,879 | Williams | Apr. 5, 1910 |
| 963,287 | Goodman | July 5, 1910 |
| 1,516,145 | Bosshardt | Nov. 18, 1924 |
| 1,800,209 | Christopherson | Apr. 14, 1931 |
| 1,949,100 | Fahrenwald | Feb. 27, 1934 |
| 2,146,906 | Moller | Feb. 14, 1939 |
| 2,166,692 | Ray | July 18, 1939 |
| 2,342,828 | Armitage et al. | Feb. 29, 1944 |
| 2,360,221 | Gradisar et al. | Oct. 10, 1944 |

FOREIGN PATENTS

| Number | Country | Date |
|---|---|---|
| 7,317 | Great Britain | May 2, 1889 |